(12) United States Patent
Sloan et al.

(10) Patent No.: US 11,780,337 B2
(45) Date of Patent: Oct. 10, 2023

(54) VEHICLE BATTERY SYSTEM

(71) Applicant: Hexagon Purus North America Holdings Inc., Lincoln, NE (US)

(72) Inventors: Todd F. Sloan, Kelowna (CA); Chris Forsberg, Kelowna (CA); Landon Tyerman, Kelowna (CA); Eric M. Coupal-Sikes, Kelowna (CA); Brad Jonathan van Hanegem, Kelowna (CA)

(73) Assignee: Hexagon Purus North America Holdings Inc., Costa Mesa, CA (US)

( * ) Notice: Subject to any disclaimer, the term of this patent is extended or adjusted under 35 U.S.C. 154(b) by 0 days.

(21) Appl. No.: 17/338,315

(22) Filed: Jun. 3, 2021

(65) Prior Publication Data

US 2022/0021056 A1    Jan. 20, 2022

Related U.S. Application Data (63) Continuation of application No. 16/863,131, filed on Apr. 30, 2020, now Pat. No. 11,043,714, which is a
(Continued)

(51) Int. Cl.
*H01M 50/20*    (2021.01)
*H01M 50/262*   (2021.01)
(Continued)

(52) U.S. Cl.
CPC ............... *B60L 50/64* (2019.02); *B60K 1/04* (2013.01); *H01M 50/204* (2021.01);
(Continued)

(58) Field of Classification Search
CPC .. H01M 50/20; H01M 50/204; H01M 50/244; H01M 50/249; H01M 50/262;
(Continued)

(56) References Cited

U.S. PATENT DOCUMENTS 1,551,594 A * 9/1925 Walter ..................... B60K 1/04
                                                      180/65.1
1,678,033 A    7/1928 Brumbaugh
(Continued)

FOREIGN PATENT DOCUMENTS

AU    2018232986    4/2019
CN    2647706       10/2004
(Continued)

OTHER PUBLICATIONS

Extended European Search Report issued in European Application No. 19852361.5, dated Apr. 12, 2022, in 8 pages.
(Continued)

*Primary Examiner* — Steve Clemmons
(74) *Attorney, Agent, or Firm* — Knobbe, Martens, Olson & Bear, LLP (57) ABSTRACT

The present disclosure relates to a battery system for a hybrid or an electric vehicle. Another aspect of the present disclosure provides a battery assembly designed for easy and quick exchange of battery assemblies enabling a vehicle to resume driving much more quickly than traditional charging permits.

27 Claims, 10 Drawing Sheets

Related U.S. Application Data continuation of application No. PCT/US2019/047773, filed on Aug. 22, 2019.

(60) Provisional application No. 62/722,758, filed on Aug. 24, 2018.

(51) Int. Cl.
  *B60L 50/64* (2019.01)
  *B60K 1/04* (2019.01)
  *H01M 50/249* (2021.01)
  *H01M 50/244* (2021.01)
  *H01M 50/204* (2021.01)

(52) U.S. Cl.
  CPC ....... *H01M 50/244* (2021.01); *H01M 50/249* (2021.01); *H01M 50/262* (2021.01); *H01M 2220/20* (2013.01)

(58) Field of Classification Search
  CPC . B60K 1/04; B60L 50/64; B60L 50/66; B60L 2200/36; B62D 21/02
  See application file for complete search history.

(56) References Cited

U.S. PATENT DOCUMENTS

| | | |
|---|---|---|
| 3,760,134 A | 9/1973 | McCray |
| 4,248,323 A | 2/1981 | Gaffney |
| 4,317,497 A | 3/1982 | Alt et al. |
| 4,365,681 A | 12/1982 | Singh |
| 5,421,600 A | 6/1995 | Jones et al. |
| 5,460,234 A | 10/1995 | Matsuura et al. |
| 5,558,949 A | 9/1996 | Iwatsuki et al. |
| 5,585,205 A | 12/1996 | Kohchi |
| 5,854,517 A | 12/1998 | Hines |
| 6,188,574 B1 | 2/2001 | Anazawa |
| 6,443,253 B1 | 9/2002 | Whitehead et al. |
| 6,547,020 B2 | 4/2003 | Maus et al. |
| 6,575,258 B1 | 6/2003 | Clemmer |
| 6,624,610 B1 | 9/2003 | Ono et al. |
| 6,668,957 B2 | 12/2003 | King |
| 6,971,657 B2 | 12/2005 | King et al. |
| 7,051,825 B2 | 5/2006 | Masui et al. |
| 7,144,039 B2 | 12/2006 | Kawasaki et al. |
| 7,237,644 B2 | 7/2007 | Matsumoto et al. |
| 7,398,849 B2 | 7/2008 | Yoshida |
| 7,507,499 B2 | 3/2009 | Zhou et al. |
| 7,931,105 B2 | 4/2011 | Sato et al. |
| 8,037,960 B2 | 10/2011 | Kiya |
| 8,051,934 B2 | 11/2011 | Kiya et al. |
| 8,122,989 B2 * | 2/2012 | Burchett ................ B60R 16/04 180/68.5 |
| 8,127,876 B2 | 3/2012 | Phillips |
| 8,276,697 B2 | 10/2012 | Takasaki |
| 8,342,279 B1 | 1/2013 | Florus et al. |
| 8,397,853 B2 | 3/2013 | Stefani et al. |
| 8,464,817 B2 | 6/2013 | Usami et al. |
| 8,474,559 B2 | 7/2013 | Sogabe |
| 8,517,126 B2 | 8/2013 | Atarashi |
| 8,596,685 B2 | 12/2013 | Mauduit et al. |
| 8,616,319 B2 | 12/2013 | Yokoyama et al. |
| 8,672,354 B2 | 3/2014 | Kim et al. |
| 8,701,842 B2 | 4/2014 | Anderson |
| 8,764,469 B2 | 7/2014 | Lamb |
| 8,776,927 B2 | 7/2014 | Akazawa et al. |
| 8,778,527 B2 | 7/2014 | Lee |
| 8,783,396 B2 | 7/2014 | Bowman |
| 8,789,635 B2 | 7/2014 | Franzen et al. |
| 8,794,361 B2 | 8/2014 | Lim et al. |
| 8,905,170 B2 | 12/2014 | Kyoden et al. |
| 9,033,078 B2 | 5/2015 | Fillion et al. |
| 9,033,085 B1 | 5/2015 | Rawlinson |
| 9,056,557 B2 | 6/2015 | Kedzierski |
| 9,061,712 B2 | 6/2015 | Patberg et al. |
| 9,077,019 B2 | 7/2015 | Kosaki et al. |
| 9,085,226 B2 | 7/2015 | Matsuda et al. |
| 9,103,092 B2 | 8/2015 | Ueda |
| 9,108,497 B2 | 8/2015 | Harrison, III et al. |
| 9,108,691 B2 | 8/2015 | Fanourakis et al. |
| 9,205,749 B2 | 12/2015 | Sakamoto |
| 9,227,582 B2 * | 1/2016 | Katayama ............ H01M 50/24 |
| 9,283,838 B2 | 3/2016 | Ohashi |
| 9,315,173 B1 | 4/2016 | Gray et al. |
| 9,321,352 B2 | 4/2016 | Pierce et al. |
| 9,409,495 B2 | 8/2016 | Kobayashi |
| 9,457,652 B2 | 10/2016 | Sloan et al. |
| 9,586,490 B2 | 3/2017 | Yamamaru et al. |
| 9,636,984 B1 | 5/2017 | Baccouche et al. |
| 9,776,665 B2 | 10/2017 | Garay et al. |
| 9,812,685 B2 | 11/2017 | Nozaki et al. |
| 9,884,545 B1 | 2/2018 | Addanki et al. |
| 9,902,348 B2 | 2/2018 | Takeda |
| 10,000,908 B2 | 6/2018 | Ota et al. |
| 10,017,037 B2 | 7/2018 | Newman et al. |
| 10,121,609 B2 | 11/2018 | Coursol |
| 10,160,344 B2 | 12/2018 | Newman |
| 10,166,883 B2 | 1/2019 | Brendecke et al. |
| 10,177,356 B1 | 1/2019 | Yang et al. |
| 10,183,698 B2 | 1/2019 | Ta et al. |
| 10,193,112 B2 | 1/2019 | Zimbru, Jr. et al. |
| 10,199,781 B2 | 2/2019 | Deatherage |
| 10,236,496 B2 | 3/2019 | Nakayama et al. |
| 10,259,329 B2 | 4/2019 | Hosaka et al. |
| 10,308,132 B2 | 6/2019 | Milton et al. |
| 10,358,023 B2 | 7/2019 | Hegewald et al. |
| 10,358,024 B2 | 7/2019 | Yugami et al. |
| 10,414,351 B2 | 9/2019 | Katano |
| 10,421,345 B2 | 9/2019 | Kerspe et al. |
| 10,427,627 B2 | 10/2019 | Fukazu et al. |
| 10,457,156 B2 | 10/2019 | Takizawa et al. |
| 10,464,613 B2 | 11/2019 | Okura |
| 10,486,515 B2 | 11/2019 | Saeki |
| 10,493,837 B1 | 12/2019 | Angelo et al. |
| 10,516,146 B2 | 12/2019 | Fees et al. |
| 10,543,796 B2 | 1/2020 | Isafushi et al. |
| 10,559,858 B2 | 2/2020 | Goitsuka et al. |
| 10,569,634 B2 | 2/2020 | Dawley |
| 10,583,746 B2 | 3/2020 | Ogaki et al. |
| 10,589,788 B1 | 3/2020 | Milton et al. |
| 10,589,797 B2 | 3/2020 | Milton et al. |
| 10,604,188 B2 | 3/2020 | Yoshii |
| 10,611,408 B2 | 4/2020 | Fritz et al. |
| 10,641,431 B2 | 5/2020 | Mallick et al. |
| 10,654,530 B2 | 5/2020 | Milton et al. |
| 10,661,680 B2 | 5/2020 | Milton et al. |
| 10,661,844 B2 | 5/2020 | Milton et al. |
| 10,668,807 B2 | 6/2020 | Milton et al. |
| 10,670,191 B2 | 6/2020 | Yeggy |
| 10,688,856 B2 | 6/2020 | Kasai et al. |
| 10,688,857 B2 | 6/2020 | Tsuyuzaki et al. |
| 10,696,251 B2 | 6/2020 | Muramatsu et al. |
| 10,703,416 B2 | 7/2020 | Okura et al. |
| 10,752,102 B2 | 8/2020 | Lampsa et al. |
| 10,823,333 B2 | 11/2020 | Criel et al. |
| 10,899,214 B2 | 1/2021 | Sloan et al. |
| 11,040,610 B2 | 6/2021 | Sloan et al. |
| 11,043,707 B2 | 6/2021 | Sloan et al. |
| 11,043,714 B2 | 6/2021 | Sloan et al. |
| 11,110,786 B2 | 9/2021 | Loacker |
| 11,312,221 B2 | 4/2022 | Sloan et al. |
| 11,345,331 B2 | 5/2022 | McKibben et al. |
| 11,652,250 B2 | 5/2023 | Sloan et al. |
| 2004/0134699 A1 | 7/2004 | Shimizu |
| 2004/0178602 A1 | 9/2004 | King et al. |
| 2004/0231831 A1 | 11/2004 | Houck et al. |
| 2005/0162015 A1 | 7/2005 | Yamaguchi et al. |
| 2005/0218136 A1 | 10/2005 | Kotani et al. |
| 2006/0102398 A1 | 5/2006 | Mizuno |
| 2007/0092764 A1 | 4/2007 | Kobayashi |
| 2008/0169139 A1 | 7/2008 | Kramer |
| 2008/0169144 A1 | 7/2008 | DeGraves et al. |
| 2008/0225483 A1 | 9/2008 | Kahn et al. |
| 2008/0258682 A1 | 10/2008 | Li |

(56) References Cited

U.S. PATENT DOCUMENTS

| | | |
|---|---|---|
| 2009/0201650 A1 | 8/2009 | Hauser et al. |
| 2010/0000816 A1 | 1/2010 | Okada |
| 2010/0112843 A1 | 5/2010 | Heichal et al. |
| 2010/0163326 A1 | 7/2010 | Takamura et al. |
| 2010/0175940 A1 | 7/2010 | Taneda et al. |
| 2010/0320012 A1 | 12/2010 | van der Stappen et al. |
| 2011/0068622 A1 | 3/2011 | Ikeno et al. |
| 2011/0114398 A1 | 5/2011 | Bianco |
| 2011/0260530 A1 | 10/2011 | Steffka et al. |
| 2012/0055725 A1 | 3/2012 | Mizoguchi et al. |
| 2012/0090907 A1 | 4/2012 | Store et al. |
| 2012/0103714 A1 | 5/2012 | Choi et al. |
| 2012/0160583 A1 | 6/2012 | Rawlinson |
| 2012/0175177 A1 | 7/2012 | Lee et al. |
| 2012/0255799 A1 | 10/2012 | Kohler et al. |
| 2012/0312612 A1 | 12/2012 | Harrison, III et al. |
| 2013/0001384 A1 | 1/2013 | Karlsson et al. |
| 2013/0108404 A1 | 5/2013 | Okumura et al. |
| 2013/0108897 A1 | 5/2013 | Christian et al. |
| 2013/0248268 A1 | 9/2013 | Matsuda et al. |
| 2014/0141288 A1 | 5/2014 | Kim et al. |
| 2014/0287284 A1 | 9/2014 | Shibata |
| 2014/0338999 A1 | 11/2014 | Fujii et al. |
| 2014/0367183 A1 | 12/2014 | Matsuda |
| 2015/0194712 A1 | 7/2015 | He et al. |
| 2015/0291056 A1 | 10/2015 | Nozaki |
| 2016/0079795 A1 | 3/2016 | Patterson et al. |
| 2016/0087256 A1 | 3/2016 | Wagner et al. |
| 2016/0190526 A1 | 6/2016 | Yamada et al. |
| 2016/0226041 A1 | 8/2016 | Jackson et al. |
| 2016/0297283 A1 | 10/2016 | Sakamoto et al. |
| 2017/0012506 A1 | 1/2017 | Naito et al. |
| 2017/0225558 A1 | 8/2017 | Newman et al. |
| 2017/0282709 A1 | 10/2017 | Sasaki et al. |
| 2017/0320382 A1 | 11/2017 | Milton et al. |
| 2018/0022389 A1 | 1/2018 | Kageyama et al. |
| 2018/0062125 A1 | 3/2018 | Kaneshige |
| 2018/0145382 A1 | 5/2018 | Harris et al. |
| 2018/0183118 A1 | 6/2018 | Harris et al. |
| 2018/0190960 A1 | 7/2018 | Harris et al. |
| 2018/0201110 A1 | 7/2018 | Yin et al. |
| 2018/0319263 A1 | 11/2018 | Hegewald et al. |
| 2018/0333905 A1 | 11/2018 | Tong et al. |
| 2018/0339594 A1 | 11/2018 | Brown et al. |
| 2018/0370368 A1 | 12/2018 | Kronsteiner et al. |
| 2019/0036181 A1 | 1/2019 | Tokozakura et al. |
| 2019/0061505 A1 | 2/2019 | Cavus et al. |
| 2019/0074495 A1 | 3/2019 | Haeusler et al. |
| 2019/0074497 A1 | 3/2019 | Haeusler et al. |
| 2019/0081298 A1 | 3/2019 | Matecki et al. |
| 2019/0084397 A1 | 3/2019 | Yugami et al. |
| 2019/0181517 A1 | 3/2019 | Kellner et al. |
| 2019/0202312 A1 | 7/2019 | Aufdencamp |
| 2019/0229314 A1 | 7/2019 | Ribbentrop et al. |
| 2019/0263449 A1 | 8/2019 | Ta et al. |
| 2019/0291560 A1 | 9/2019 | Lampsa et al. |
| 2019/0296541 A1 | 9/2019 | Mensch et al. |
| 2019/0302764 A1 | 10/2019 | Smith et al. |
| 2019/0326573 A1 | 10/2019 | Ozawa et al. |
| 2019/0393571 A1 | 12/2019 | Weicker et al. |
| 2020/0002828 A1 | 1/2020 | Mills et al. |
| 2020/0083573 A1 | 3/2020 | Caliskan et al. |
| 2020/0088299 A1 | 3/2020 | Baumer et al. |
| 2020/0094669 A1 | 3/2020 | DeLizo et al. |
| 2020/0139808 A1 | 5/2020 | Rike |
| 2020/0152938 A1 | 5/2020 | Winger et al. |
| 2020/0156500 A1 | 5/2020 | Huff et al. |
| 2020/0157769 A1 | 5/2020 | Huff et al. |
| 2020/0180848 A1 | 6/2020 | Snyder et al. |
| 2020/0247225 A1 | 8/2020 | Kochi et al. |
| 2020/0369228 A1 | 11/2020 | Kageyama et al. |
| 2020/0384854 A1 | 12/2020 | Sloan et al. |
| 2020/0406777 A1 | 12/2020 | Nguyen et al. |
| 2021/0036649 A1 | 2/2021 | Iwazaki |
| 2021/0094400 A1 | 4/2021 | Loacker et al. |
| 2021/0155224 A1 | 5/2021 | McKibben et al. |
| 2021/0213821 A1 | 7/2021 | Sloan et al. |
| 2021/0218101 A1 | 7/2021 | Menon et al. |
| 2022/0021050 A1 | 1/2022 | Sloan et al. |
| 2022/0111716 A1 | 4/2022 | McKibben et al. |
| 2022/0242215 A1 | 8/2022 | Sloan et al. |
| 2022/0274494 A1 | 9/2022 | McKibben et al. |

FOREIGN PATENT DOCUMENTS

| | | | |
|---|---|---|---|
| CN | 103863080 | 6/2014 | |
| CN | 104993151 A | 10/2015 | |
| CN | 105438262 | 3/2016 | |
| DE | 101 08 713 A1 | 9/2002 | |
| DE | 10 2006 009 189 | 7/2007 | |
| DE | 10 2011 109 024 | 1/2013 | |
| DE | 10 2012 109062 | 3/2014 | |
| DE | 10 2013 000112 | 3/2014 | |
| EP | 1 577 143 A1 | 9/2005 | |
| EP | 2 008 917 | 12/2008 | |
| EP | 2 554 420 | 5/2014 | |
| EP | 2 712 748 B1 | 5/2017 | |
| EP | 2 712 788 | 2/2020 | |
| EP | 3 640 123 A1 | 4/2020 | |
| ES | 1079022 | 4/2013 | |
| GB | 491788 | 9/1938 | |
| GB | 527052 | 10/1940 | |
| GB | 744973 A | 2/1956 | |
| GB | 2546535 A | 7/2017 | |
| GB | 2555906 | 5/2018 | |
| JP | 2004142524 A * | 5/2004 | ............. B60L 1/003 |
| JP | 2010-100207 | 5/2010 | |
| JP | 2014-069686 | 4/2014 | |
| KR | 10-1998-0035495 | 8/1998 | |
| KR | 10-2017-0000950 | 1/2017 | |
| WO | WO 2014/044618 | 3/2014 | |
| WO | WO 2016/210329 | 12/2016 | |
| WO | WO 2018/123337 | 7/2018 | |
| WO | WO 2020/041630 | 2/2020 | |
| WO | WO 2020/215018 | 10/2020 | |
| WO | WO 2020/215023 | 10/2020 | |
| WO | WO 2021/108429 | 6/2021 | |
| WO | WO 2022/125929 | 6/2022 | |
| WO | WO 2023/027959 | 3/2023 | |
| WO | WO 2023/027960 | 3/2023 | |
| WO | WO 2023/027961 | 3/2023 | |
| WO | WO 2023/027965 | 3/2023 | |

OTHER PUBLICATIONS

International Search Report and Written Opinion Issued in PCT Application No. PCT/US2021/062856, dated Apr. 18, 2022, in 12 pages.
Kenworth, "K270E, Zero Emissions", 2020, in 2 pages.
International Search Report and Written Opinion issued in PCT Application No. PCT/US2019/047773, dated Nov. 18, 2019, in 16 pages.
International Search Report and Written Opinion issued in International Patent Application No. PCT/US2020/028859, dated Sep. 4, 2020 in 15 pages.
International Search Report and Written Opinion issued in International Patent Application No. PCT/US2020/028866, dated Aug. 14, 2020 in 18 pages.
Invitation to Pay Additional Search Fees in International Patent Application No. PCT/US2020/028859, dated Jul. 1, 2020 in 2 pages.
Invitation to Pay Additional Search Fees in International Patent Application No. PCT/US2020/028866, dated Jun. 4, 2020 in 2 pages.
Tuma, "How to store lithium ion battery cell pack in electric bus?", dated Jul. 3, 2019, in 7 pages.
Tuma, Sliding Rails for Ebus Lithium Battery Pack Tray Automatic Bus Door Opening Mechanism, dated Aug. 15, 2019, in 3 pages.

* cited by examiner

FIG. 7A

VEHICLE BATTERY SYSTEM

BACKGROUND

Field

The present disclosure relates to battery systems for heavy-duty vehicles and a method for equipping heavy-duty vehicles with such systems.

Related Art

The use of alternative fuels for vehicles is becoming more prevalent. Natural gas powered automobiles produce less harmful emissions than do automobiles powered by traditional fossil fuels. A growing trend is the use of electrical motors for propulsion.

Electric drive systems have become ubiquitous for small passenger vehicles. However, long wait time to charge batteries is an obstacle to wider adoption of electric drive systems.

SUMMARY

An aspect of the present invention provides a battery system for a hybrid or an electric vehicle. Another aspect of the present invention provides a battery assembly designed for easy and quick exchange of battery assemblies enabling a vehicle to resume driving much more quickly than traditional charging permits.

In one embodiment a battery assembly is provided for an electric vehicle. The battery assembly has a housing, one or more battery units and a mounting system. The housing has a first lateral portion, a second lateral portion, and a central portion. The housing forms an upwardly oriented recess between the first and second lateral portions. The mounting system can be disposed at least partially between the first lateral portion and the second lateral portion. A frame member of a vehicle can be disposed between first and second lateral portions. When so disposed, the frame member can be coupled to the mounting system between first and second lateral portions above the central portion.

In one embodiment, the one or more battery units is or are disposed within the housing at least in the central portion.

In some variations, at least a portion of the one or more battery units is disposed in the first lateral portion. In some variations, at least a portion of the one or more battery units is disposed in the second lateral portion. In some variations, at least a portion of the one or more battery units is disposed in the first lateral portion and in the second lateral portion.

In another embodiment the housing comprises a W-shaped housing.

The housing can be configured to be exposed to the road beneath the vehicle when the battery assembly is coupled to a frame member of a vehicle.

The mounting system can comprise a first component coupled with the housing and a second component configured to be coupled with the frame member. The first component can be configured to be releasably coupled to the second component. In this context, the releasable coupling can be one that facilitates quick exchange of the battery assembly for another, fully charged, battery assembly.

Where provided the second component of the mounting system can be configured to be coupled with a lateral portion of, e.g., an outwardly facing side of, the frame member.

When provided, the second component of the mounting system can include one or more brackets disposed on one or both of a first inside surface of the first lateral portion and on a second inside surface of the second lateral portion.

Where provided, the brackets of the mounting system can include U-shaped members configured to be disposed around the second component of the mounting system.

The housing is configured such that a lengthwise frame member of the vehicle can be disposed between the first lateral portion and the second lateral portion.

In some embodiments, the housing is configured to be coupled to the mounting system from beneath the vehicle. The housing can be moved transversely to the long axis of the vehicle, e.g., between forward and rearward wheels of the vehicle. The housing can be moved longitudinally along the long axis of the vehicle, e.g., under an axle between driver side and passenger side wheels coupled with the axle.

BRIEF DESCRIPTION OF THE DRAWINGS

The systems, methods and devices may be better understood from the following detailed description when read in conjunction with the accompanying schematic drawings, which are for illustrative purposes only. The drawings include the following figures:

FIGS. 6A to 7C illustrate apparatuses and processes for mounting a battery assembly according to an embodiment of the invention.

DETAILED DESCRIPTION

This application is directed to novel electric vehicle components and assemblies. The components described and claimed herein can be used in vehicles that are powered solely by electric motor(s) and in vehicles that are powered by a combination of power sources including electric motors and fossil fuels, e.g., natural gas fuel systems.

Figure 1A:
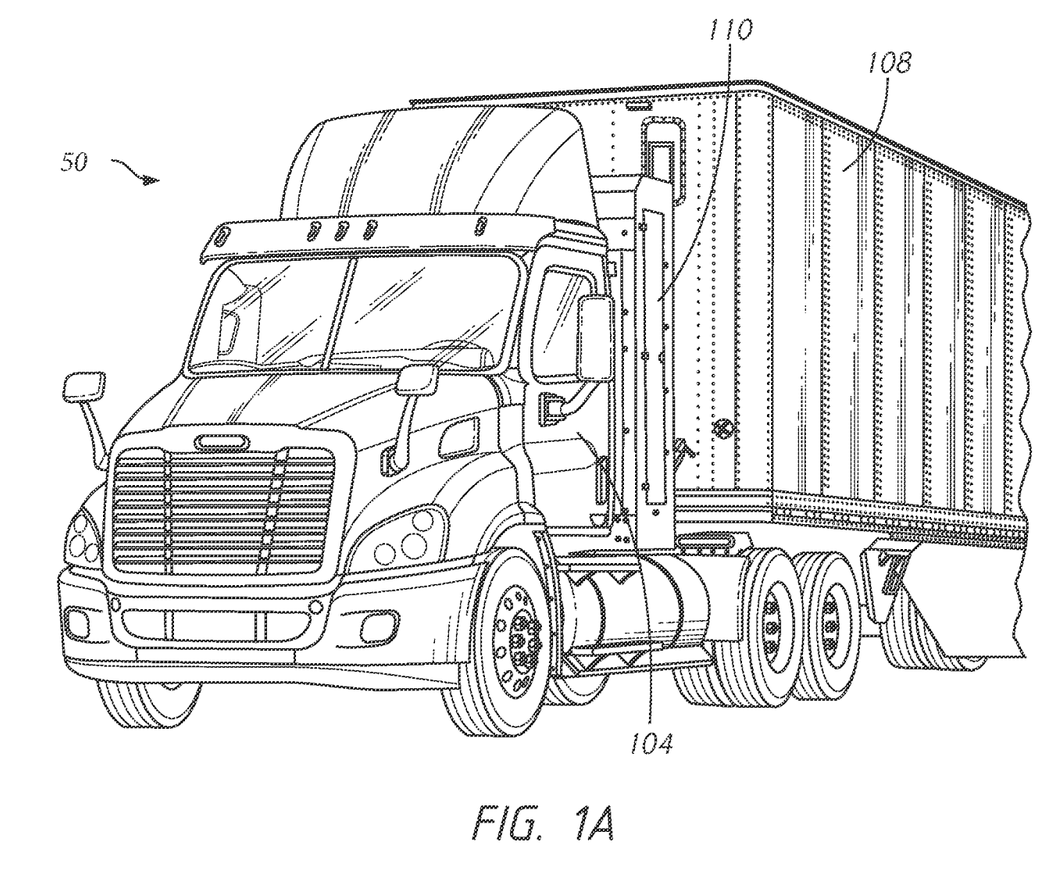
FIG. 1A is a perspective view of a truck having a fossil fuel system that can be configured with an electric power propulsion system according to an embodiment of the invention.

FIG. 1A illustrates a vehicle 50 with a fossil fuel system 110 disposed within an enclosure behind a cab 104. The fuel system 110 can power a combustion engine. The vehicle 100 can be powered by an electric motor (not shown) as disclosed herein. In one embodiment, the truck has multiple distinct energy sources that are capable of operating independently. In certain embodiments, the truck has no combustion engine and uses an electric motor for its propulsion power.

Figure 1B:
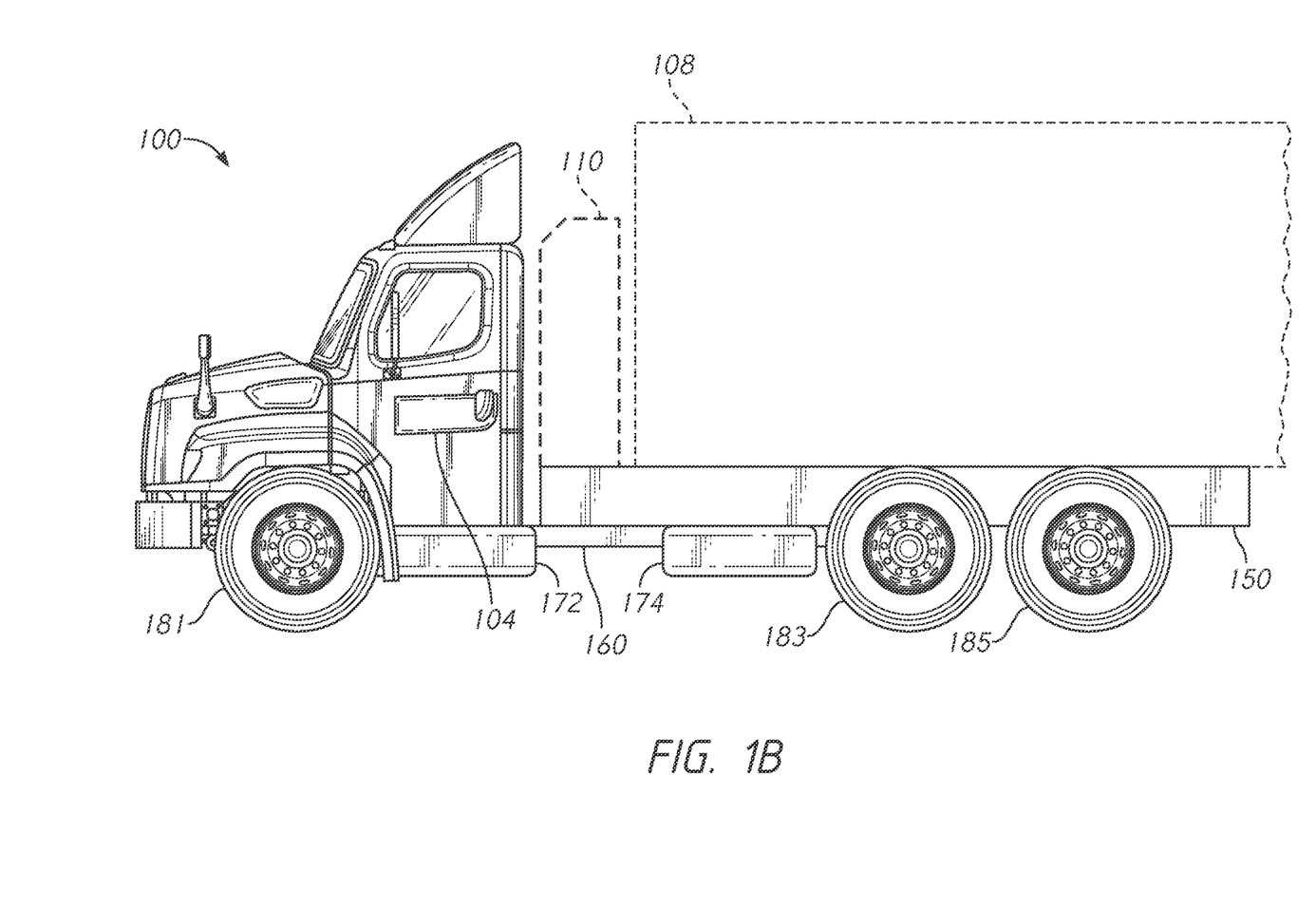
FIG. 1B is a side view of the a truck according to an embodiment of the invention.

FIG. 1B illustrates a side view of a vehicle 100 according to an embodiment of the invention. The vehicle 100 has a cab 104 and a vehicle frame for loading cargo 108. The vehicle 100 has an electric drive system and at least one battery to power the electric drive system. The fossil fuel system 110 is shown in dash line, indicating that in this embodiment such a system is optional and may not be present.

In FIG. 1B, a first battery assembly 172 is located under the cab 104 and a second battery assembly 174 is located under the cargo frame 150. In certain embodiments, the truck has no battery to power its electric drive system under the cab 104, and instead has one or more battery assemblies under the cargo area of the vehicle. In certain embodiments, the truck has no battery to power its electric drive system under the cargo frame 150 and instead has one or more battery assemblies forward of the cargo area, e.g., under the cab 104.

In FIG. 1B, the two batteries 172, 174 are coupled to a beam 160 that is fixed to the cargo frame 150 and/or a frame of the cab 104. The beam 160 is a structural member that bears the load of the cargo frame 150 and also supports other components directly or indirectly, such as the wheels and axles. The beam 160 is sometimes referred to herein as a rail or frame rail. In certain embodiments, a battery to power the vehicle's electric drive system is fixed to a frame of the cab 104.

Figure 1C:
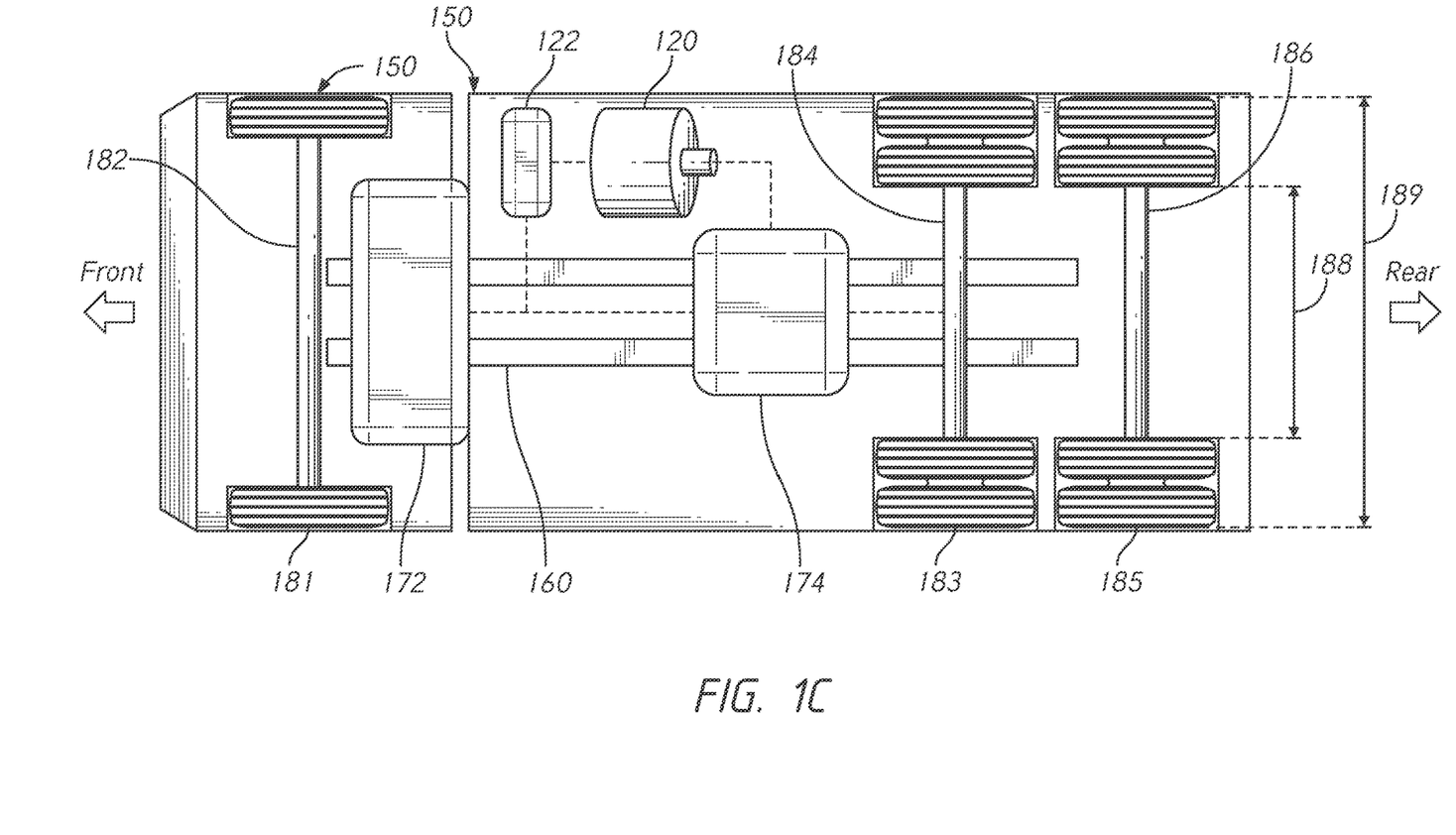
FIG. 1C is a bottom view of a truck according to an embodiment of the invention.

Referring to FIG. 1B, the second battery assembly 174 is sized such that the second battery assembly 174 does not overlap the wheels 181, 183, 185 of the truck. FIG. 1C shows that if the battery assembly 174 is forward of the rear wheels 183, 185, the width dimension of a housing of the battery assembly 174 can be greater than the distance 188 between the inside of the inner wheels. Generally, the battery assembly 174 will not be wider than the distance 189 between the outer sides of the outermost wheels.

FIG. 1C illustrates a bottom view of the vehicle 100 according to an embodiment of the invention. The truck has at least one beam (or frame rail) 160 installed under the cab 104 and the cargo frame 150. The beam 160 extends generally along a longitudinal direction of the vehicle 100 for holding the cargo frame 150 and other systems such as the wheels and axles, suspension, exhaust, as well as one or both of the battery assemblies 172, 174. Referring to FIG. 1C, the beam 160 extends to overlap a first rear-wheel axle 184 adjacent to or immediately neighboring the front-wheel axle 182. The beam 160 does not extend beyond the front-wheel axle 182 or beyond the first rear-wheel axle 186 in some embodiments. In certain embodiments, the beam 160 extends to overlap all of the axles 182, 184, 186 or does not overlap any of the axles 182, 184, 186 when viewed from the bottom. FIG. 1C shows that the battery assemblies 172, 174 are located in a space between the front-wheel axle 182 and the rear-wheel axle 184 adjacent to or immediately neighboring the front-wheel axle 182 in one embodiment.

Figure 1D:
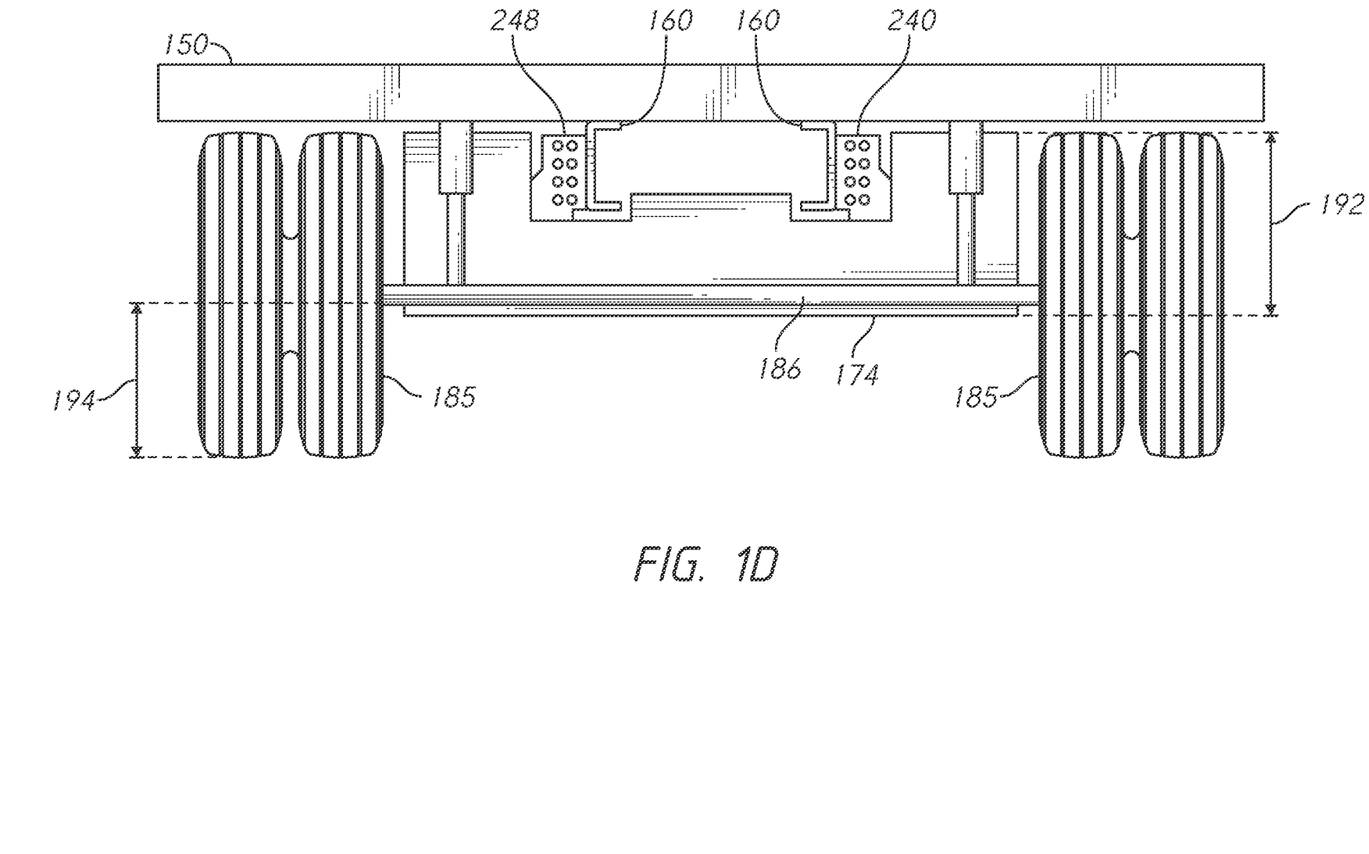
FIG. 1D is a rear view of a truck according to an embodiment of the invention.

FIG. 1D illustrates a rear view of the vehicle 100 according to an embodiment of the invention. The beam 160 is installed under the cargo frame 150 between rear wheels 185. The battery assembly 174 is coupled to the beam 160 using mounting systems 240, 248. In certain embodiments, the clearance 194 below the rear axles 184, 186 is greater than the height 192 of the battery assembly 174 such that the battery assembly 174 can move under the rear axles 184, 186 and between the rear wheels 185 for exchanging battery assemblies. Manners of securing the first battery 172 or the second battery 174 to the 160 are discussed below in connection with FIGS. 3-5, FIGS. 6A-6C and FIGS. 7A-7C.

FIG. 1C is a schematic view of an electric drive system according to an embodiment of the invention. The vehicle 100 uses at least one motor 120 for propulsion. At least one battery assembly 172, 174 of the vehicle 100 provides power in the form of electric current to drive the motor 120. The vehicle 100 comprises an electric current conveyance system 122 for connecting the battery assembly 172, 174 and the motor 120. The vehicle 100 has a transmission system (not shown) to deliver torque generated by the motor 120 to one or more wheel driving axles, e.g., to the axle 184.

Figure 2:
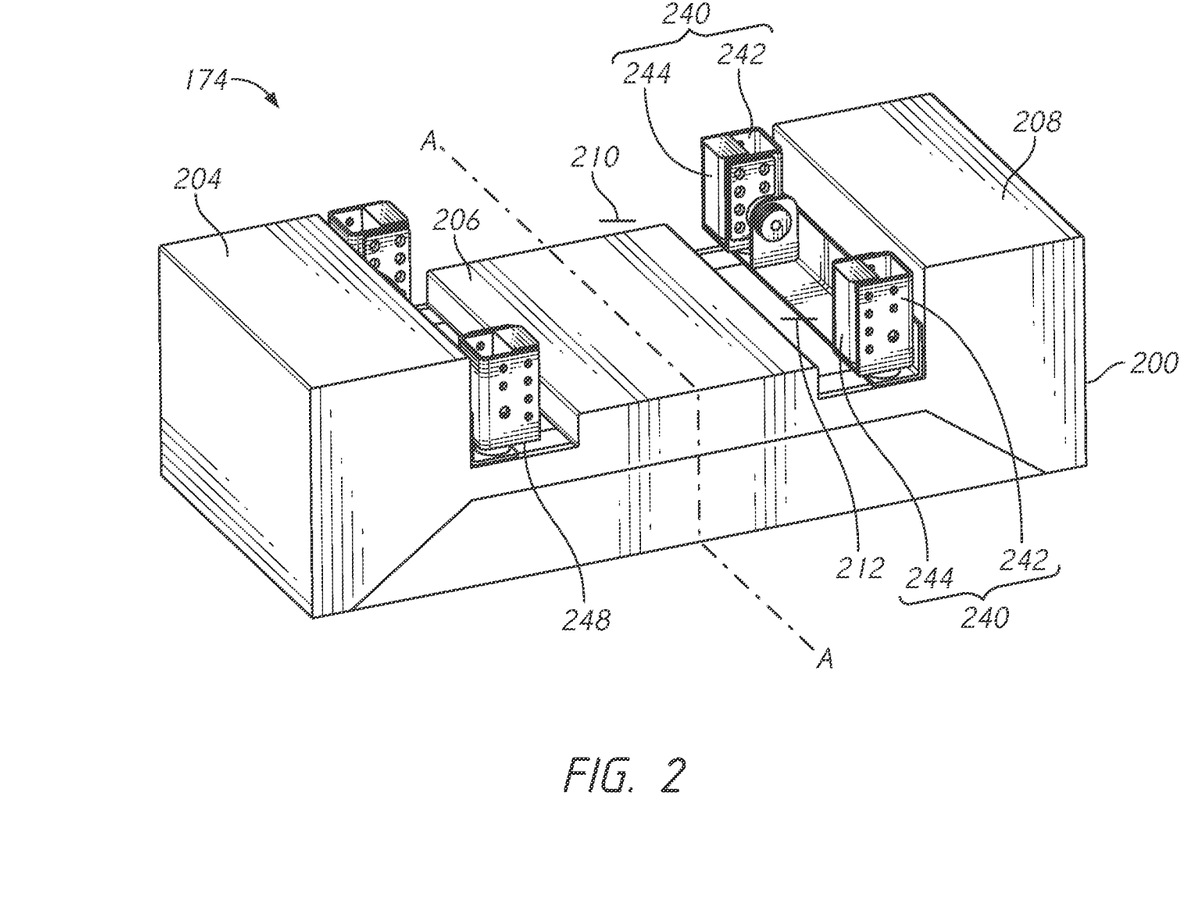
FIG. 2 is a schematic view of a battery assembly of an electric drive system according to an embodiment of the invention.
Figure 3:
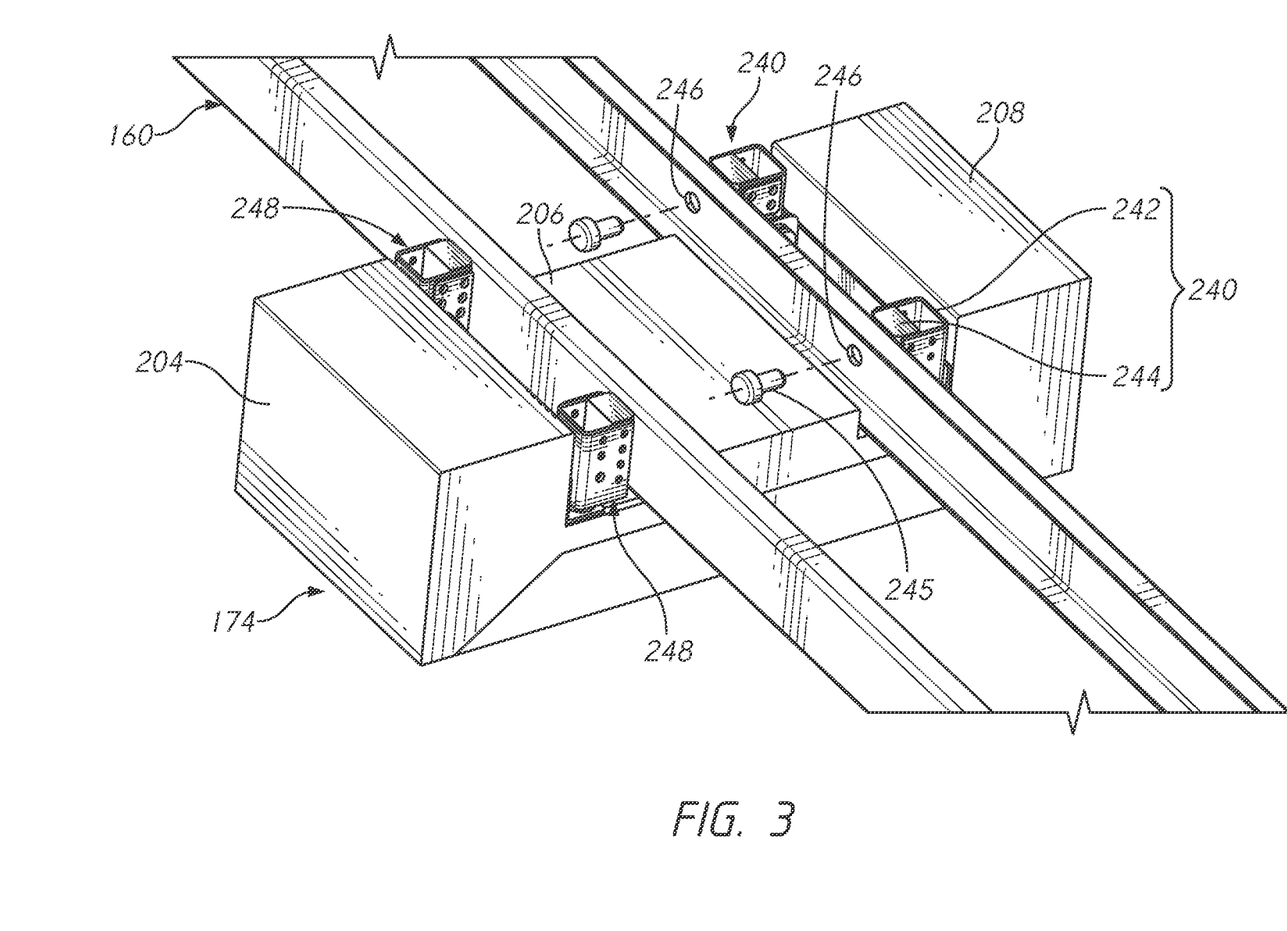
FIG. 3 is a perspective view of a battery assembly according to an embodiment of the invention coupled with frame rails of a vehicle.
Figure 4:
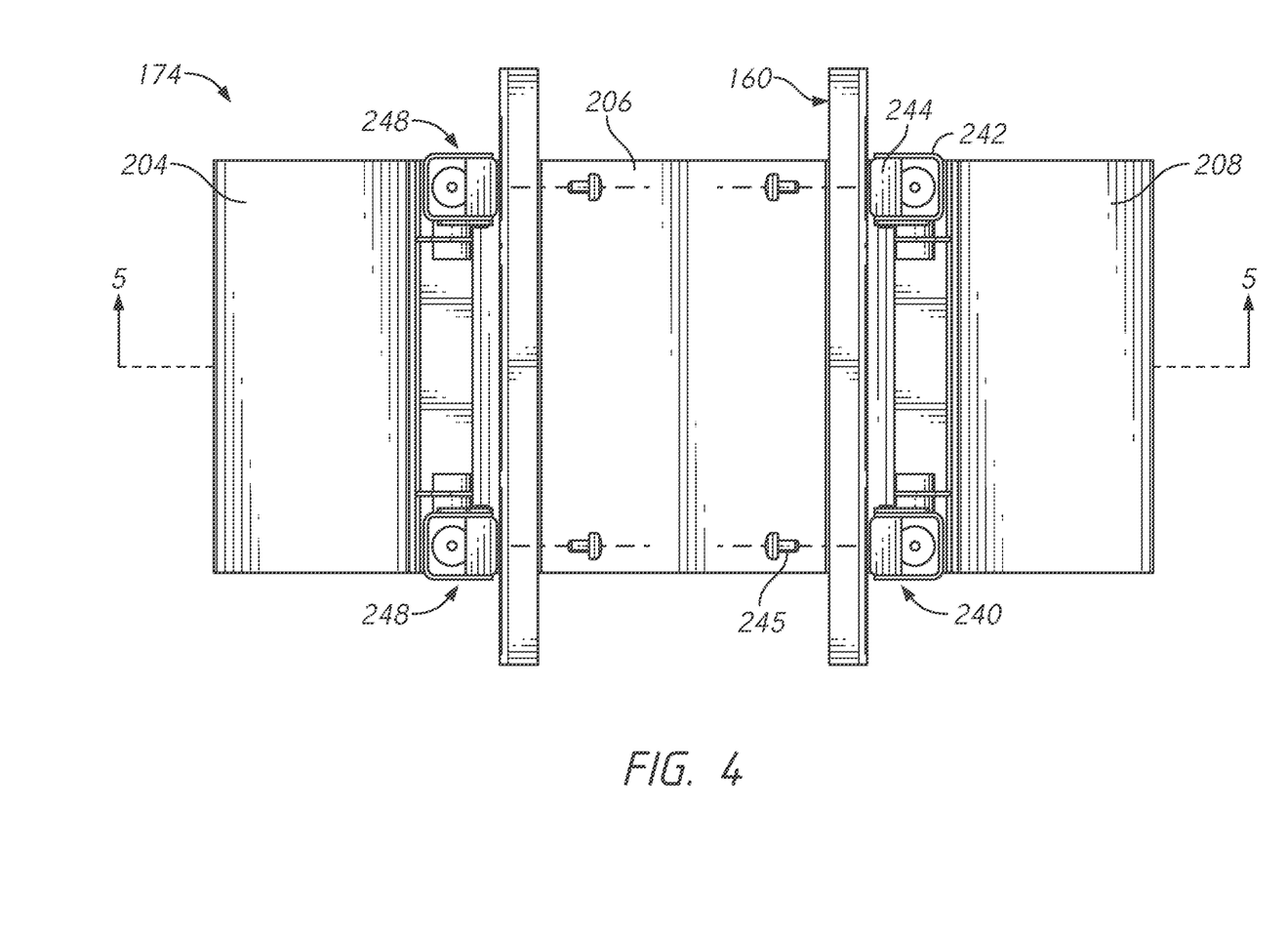
FIG. 4 is a top view of the battery assembly of FIG. 3 coupled with frame rails of a vehicle.

FIG. 2 is a perspective view of the battery assembly 174 according to an embodiment of the invention. FIG. 3 illustrates the battery assembly 174 coupled with the beam 160. FIG. 4 is a top view of the battery assembly 174 coupled with the beam 160.

Figure 5:
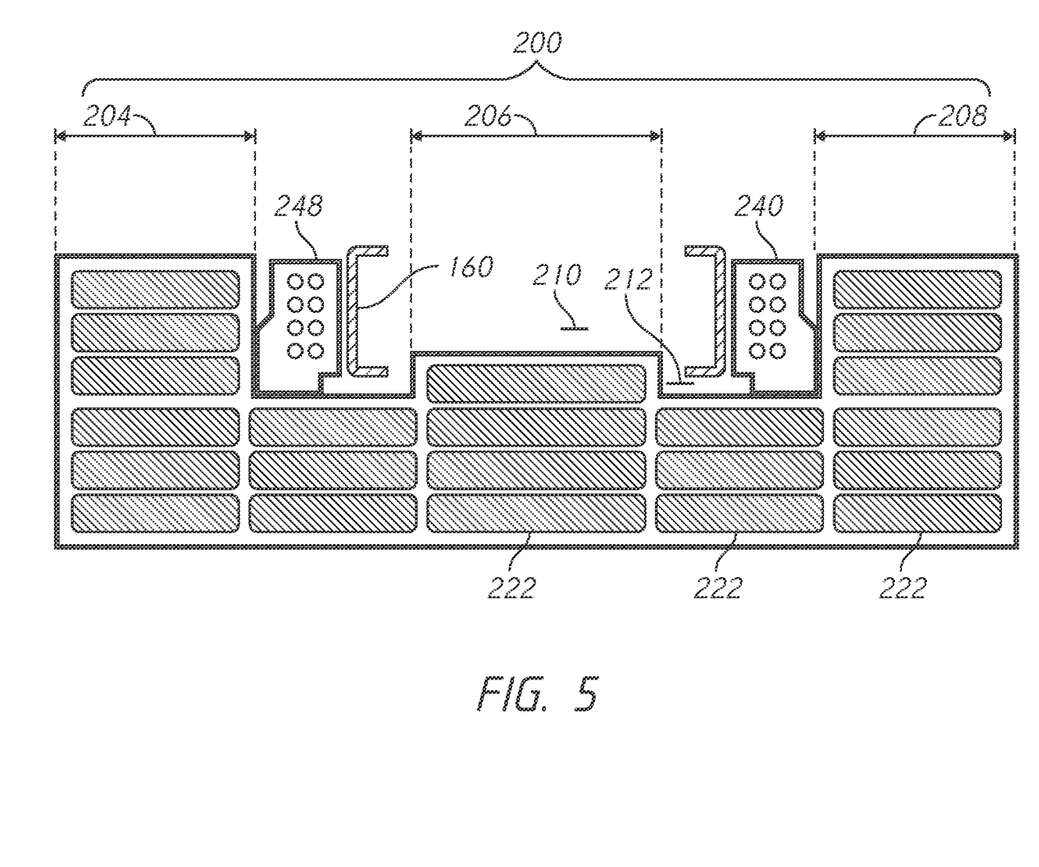
FIG. 5 is a cross-sectional view of one embodiment of the battery assembly of FIGS. 3-4 taken at section plane 5-5 in FIG. 4.

Referring to FIG. 2, the battery assembly 174 includes a housing 200 and at least one mounting system 240, 248 for coupling the battery assembly 174 to the beam 160. The housing 200 comprises a first lateral portion 204, a second lateral portion 208, and a central portion 206 interposed between the lateral portions 204, 208 in one embodiment. The central portion 206 does not extend as far in the vertical direction as the lateral portions 204, 208. A space 210 is provided between the lateral portions 204, 208 to receive the beam 160 as illustrated in FIGS. 4 and 5. The space 210 can be disposed between an inward facing surface of the first lateral portion 204 and an inward facing surface of the second lateral portion 204. The inward facing surface can be surfaces that face toward a central vertical longitudinal plane of the vehicle 100 when the battery assembly 174 is mounted thereto. In other words, the inward surfaces can be closer to the central vertical longitudinal plane than are outward surfaces of the first and second lateral portions 204, 208 which face away from that central longitudinal plane.

The housing 200 of the battery assembly 174 is generally symmetrical about a central plane A-A. The mounting system 240 and the mounting system 248 are also symmetrical about the central plane A-A. In certain embodiments, the battery assembly 174 is asymmetrical about the plane A-A, and the mounting system 248 connected to the first lateral portion 204 and the mounting system 240 connected to the second lateral portion 208 have different configurations.

At least one mounting system 240 is provided in a recess 212 between the central portion 206 and the first lateral portion 204. The recess 212 can include a bight formed by the housing 200. The bight can be formed in a concave periphery on the top side of the housing 200. The bight can include a more complex shape such as two U-shaped or concave portions on opposite sides of a central vertical plane of the housing 200. The mounting system 240 includes a first member 242 fixed to a wall of the housing 200 (e.g., to a wall of the second lateral portion 208) that is facing the beam 160 and a second member or component 244 for connecting the first member 242 to the beam 160. In some embodiments, when the battery 174 is lifted to a position where the first member 242 of the mounting system 240 is at a level of the beam, the second member 244 is fixed to the beam by fastening a bolt (that is accessible from the space 206). In certain embodiments, the second member 244 is fixed to the beam using at least one bolt 245, the beam 160 has at least one through hole 246 for receiving the bolt 245, and the second member 244 has at least one screw hole for receiving the bolt 245. In certain embodiments, a procedure to secure the battery assembly 174 to the beam comprises: (1) when the vehicle 100 is parked, moving the battery assembly 174 on or over the ground to place it under the beam 160; (2) lifting the battery assembly 174 to a set position of FIG. 3 where the through hole 246 is aligned with a screw hole of the bracket 244; and (3) fastening the bolt 245 to bracket 244 passing the through hole 246. In various techniques, a motorized screwdriver, impact wrench or other hand tool can access the bolt 245 in the space 210 over the central portion 206 of the battery assembly 174. In another method, the second member 244 is secured to the beam 160 and the bolt 245 may be advanced through any of the holes in the side of the first member 242. More specifically, the bolt 245 can be advanced through any of the holes in a direction parallel to the central plane A-A and into the second member 244. An impact wrench or other tool can be used to secure the bolt 245 in this direction and in this manner.

FIG. 5 is a cross sectional view of the battery assembly 174 coupled with the frame rails 160 of a vehicle as shown in FIG. 4. The housing 200 of the battery assembly 174 contains or encloses a plurality of battery units or cells 222. The housing 200 is fixed to the beam (e.g., frame rail) 160 using the mounting system 240, 248 such that some of the battery units 222 are disposed laterally of the frame rails 160 and some are disposed between the frame rails 160. More particularly, the mounting system 240 enables the frame rails 160 to support battery cells over a wide area beneath the vehicle 100, with some battery cells at the central vertical longitudinal plane of the vehicle 100, and some disposed laterally between the central vertical longitudinal plane of the vehicle 100 and the frame rails 160 and with some of the battery cells laterally between the frame rails 160 and the lateral outer extent of the vehicle 100, e.g., such that the frame rails are between at least some of the battery cells 222 and the central vertical longitudinal plane of the vehicle 100. Referring to the at least one battery cell 222 are contained in portions of the housing 200 corresponding to the mounting system 240, e.g., in the central portion 212 of the housing, at a level of, lateral of, and/or below the mounting system 240 to increase the number of contained battery cells while allowing a vacant space 210 between the lateral portions 204, 208.

Figure 6A:
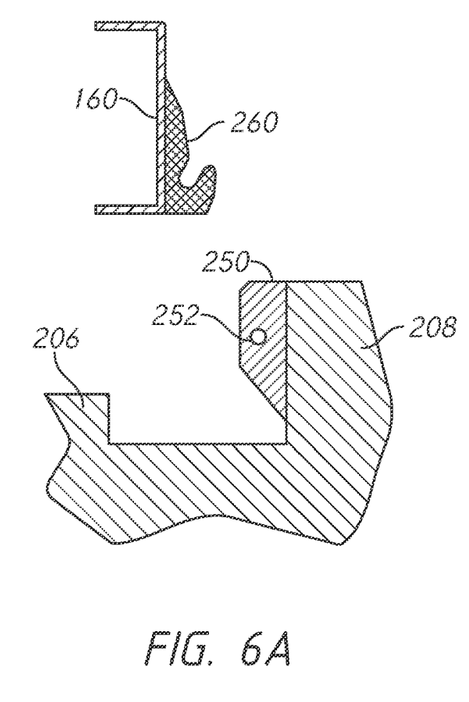
Figure 6B:
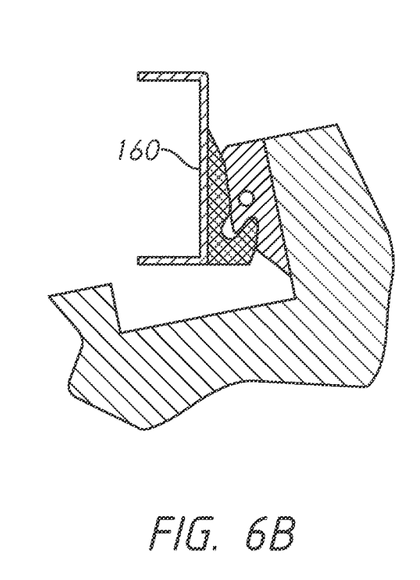
Figure 6C:
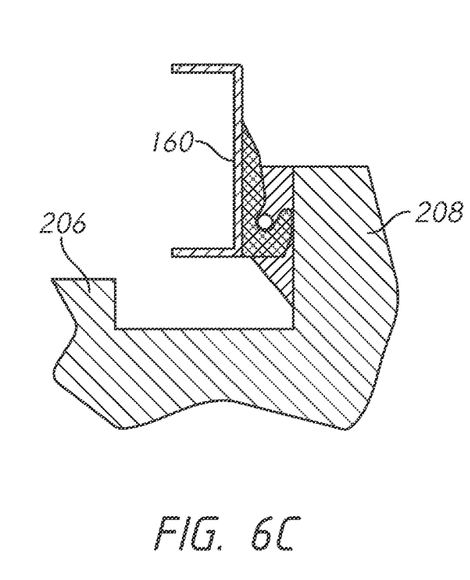

FIGS. 6A to 6C illustrate processes for mounting a battery assembly according to an embodiment of the invention. A first bracket 260 fixed to the beam 160 is engaged with a second bracket 250 for coupling the lateral portion 208 of the housing to the beam. The lateral portion 208 and the second bracket 250 can be moved from one side of the vehicle 100 under the frame rails 160 across the central vertical longitudinal plane of the vehicle 100 then lifted to be disposed over at least a portion of the first bracket 260. When the battery cell 174 is lifted from a set position of FIG. 6A to a lifted position of FIG. 6B, a coupling pin 252 of the second bracket 250 is elevated above a recess 262 of the first bracket 260. When the battery assembly is in a mounted position of FIG. 6C, the coupling pin 252 is received in the recess 262 of the first bracket 260 such that one side of the battery assembly 174 is coupled to one of the beams 160 of the vehicle. In certain embodiments, subsequent to coupling the lateral portion 208 to the beam 160 in the mounted position of FIG. 6C, another mounting system 248 connected to the lateral portion 204 at the other side of the battery assembly 174 is aligned with the beam 160 and then secured to the beam 160 using a bolt (or other fastening system) to prevent the battery assembly 174 from moving relative to the beam 160 and to prevent the coupling pin 252 from coming out of the recess 262. More details about coupling of the brackets 250, 260 can be found in PCT Application No. PCT/US2016/039363, which is hereby incorporated in its entirety by reference as if fully set forth herein.

Figure 7A:
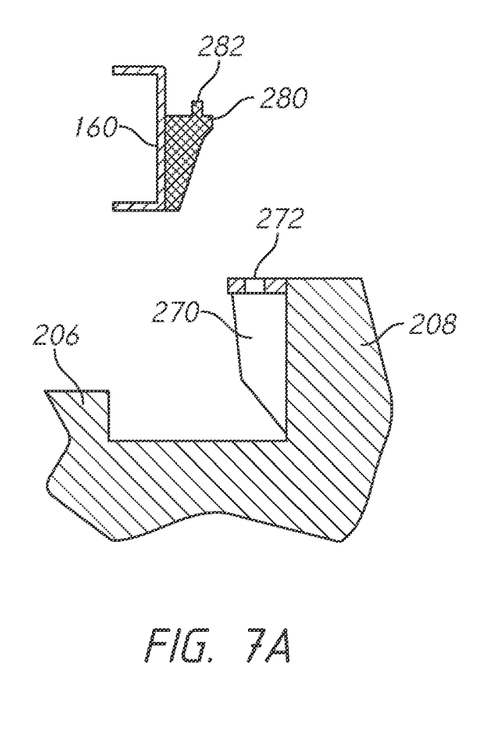
Figures 7B, 7C:
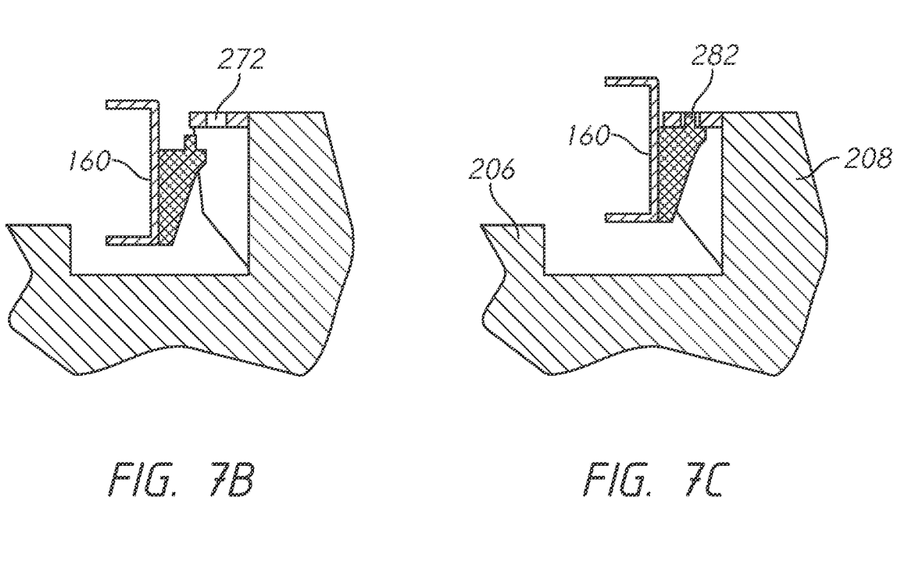

FIGS. 7A to 7C illustrate a process for mounting a battery assembly according to an embodiment of the invention. A third bracket 280 fixed to the beam 160 is engaged with a fourth bracket 270 for coupling the lateral portion 208 of the housing to the beam 160. When the battery cell 174 is lifted from a set position of FIG. 7A to a lifted position of FIG. 7B, a coupling protrusion 282 of the third bracket 280 is elevated over a hole 272 of the forth bracket 270. When the battery assembly is in a mounted position of FIG. 7C, the coupling protrusion 282 is inserted to the hole 272 of the fourth bracket 270 such that the battery cell 174 is coupled to the beam 160. In some embodiments, subsequent to coupling the lateral portion 208 to the beam 160 in the mounted position of FIG. 7C, another mounting system 248 connected to the lateral portion 204 at the other side of the battery assembly 174 is aligned with the beam 160 and then secured to the beam 160 using a bolt (or other fastening system) to prevent the battery assembly 174 from moving relative to the beam 160 and to prevent the coupling pin 252 from coming out of the recess 262. More details about coupling of the brackets 270, 280 can be found in U.S. application Ser. No. 14/057,410, which is hereby incorporated in its entirety by reference as if fully set forth herein.

Further Details of the Fuel System

FIG. 1A shows the fuel system 110 mounted to the vehicle 50 in a behind-the-cab or back-of-cab configuration. More details of the fuel system 110 can be found in U.S. application Ser. No. 15/014,933 which is hereby incorporated in its entirety by reference as if fully set forth herein.

While the present description sets forth specific details of various embodiments, it will be appreciated that the description is illustrative only and should not be construed in any way as limiting. Furthermore, various applications of such embodiments and modifications thereto, which may occur to those who are skilled in the art, are also encompassed by the general concepts described herein. Each and every feature described herein, and each and every combination of two or more of such features, is included within the scope of the present invention provided that the features included in such a combination are not mutually inconsistent.

The above presents a description of systems and methods contemplated for carrying out the concepts disclosed herein, and of the manner and process of making and using it, in such full, clear, concise, and exact terms as to enable any person skilled in the art to which it pertains to make and use this invention. The systems and methods disclosed herein, however, are susceptible to modifications and alternate constructions from that discussed above which are within the scope of the present disclosure. Consequently, it is not the intention to limit this disclosure to the particular embodiments disclosed. On the contrary, the intention is to cover modifications and alternate constructions coming within the spirit and scope of the disclosure as generally expressed by the following claims, which particularly point out and distinctly claim the subject matter of embodiments disclosed herein.

Although embodiments have been described and pictured in an exemplary form with a certain degree of particularity, it should be understood that the present disclosure has been made by way of example, and that numerous changes in the details of construction and combination and arrangement of parts and steps may be made without departing from the spirit and scope of the disclosure as set forth in the claims hereinafter.

What is claimed is:

1. A battery assembly for an electric vehicle, comprising:
    a housing having a first outwardly facing side, a second outwardly facing side, and a central portion, the housing forming an upwardly oriented surface between the first and second outwardly facing sides;
    one or more battery units disposed within the housing in the central portion; and
    a mounting system disposed at least partially between the first outwardly facing side and the second outwardly facing side;
    wherein a lengthwise frame member of the electric vehicle can be disposed between the first and second outwardly facing sides and when so disposed can be coupled to the mounting system between the first and second outwardly facing sides; and
    wherein the first outwardly facing side faces outwardly relative to a length of the electric vehicle.

2. The battery assembly of claim 1, wherein the housing comprises an upward oriented recess formed in part by the upwardly oriented surface.

3. The battery assembly of claim 1, wherein the housing comprises a W-shaped housing.

4. The battery assembly of claim 1, wherein the housing is configured to be exposed to a road beneath the electric vehicle when the battery assembly is coupled to a frame member of the electric vehicle.

5. The battery assembly of claim 1, wherein the mounting system comprises a first component coupled with the housing and a second component configured to be coupled with the lengthwise frame member, the first component configured to be releasably coupled to the second component.

6. The battery assembly of claim 5, wherein the second component is configured to be coupled with a lateral portion of the lengthwise frame member on an outboard side of the frame member.

7. The battery assembly of claim 5, wherein the first component comprises one or more brackets disposed adjacent to the upwardly oriented surface.

8. The battery assembly of claim 5, wherein the first component is coupled with the housing and extends away from the upwardly oriented surface to a connection portion configured to couple with the second component to suspend the battery assembly from the lengthwise frame member.

9. The battery assembly of claim 1, wherein at least a portion of one of the one or more battery units is disposed in a first lateral portion disposed between the central portion and the first outwardly facing side and/or in a second lateral portion disposed between the central portion and the second outwardly facing side.

10. The battery assembly of claim 9, wherein at least one of the first lateral portion and the second lateral portion extend upwardly along a vertical portion of the mounting system.

11. The battery assembly of claim 1, wherein the mounting system is configured to couple the housing to the electric vehicle from beneath the electric vehicle.

12. The battery assembly of claim 1, wherein the mounting system comprises a pin and groove connection facilitating at least partial support of the housing on the lengthwise frame member of the electric vehicle without additional fasteners.

13. The battery assembly of claim 1, wherein the mounting system is configured to support the battery assembly from only outward sides of a frame assembly.

14. A vehicle assembly, comprising:
    a frame assembly comprising a frame rail; and
    a frame rail mounting member coupled with the frame rail;
    the battery assembly of claim 1, wherein the mounting system comprises one or more brackets coupled with the housing and coupled with the frame rail mounting member at a location spaced away from the upwardly oriented surface.

15. The vehicle assembly of claim 14, wherein the frame rail mounting member is coupled with an outboard surface of the frame rail.

16. The vehicle assembly of claim 15, wherein the frame rail comprises a first frame rail and further comprising a second frame rail, the first and second frame rails extending along a longitudinal axis of the frame assembly, wherein the vehicle assembly further comprises a second frame rail mounting member coupled with an outboard side of the second frame rail, the mounting system comprising one or more brackets coupled with the housing and with the second frame rail mounting member.

17. The vehicle assembly of claim 16, wherein the mounting system supports the battery assembly from only outboard sides of the first frame rail and the second frame rail.

18. The vehicle assembly of claim 14, wherein the frame rail comprises a first frame rail and further comprising a second frame rail, the first and second frame rails extending along a longitudinal axis of the frame assembly, wherein the central portion of the housing of the battery assembly is disposed at least partially in a space between the first and second frame rails at an elevation above a bottom portion of at least one of the first and the second frame rails.

19. A battery assembly, comprising:
    a housing having a first lateral portion, a second lateral portion, and a central portion;
    one or more battery units disposed within the central portion of the housing; and
    a mounting system comprising a plurality of brackets coupled with the housing;
    wherein a frame member of a vehicle can be disposed between the first and the second lateral portions and when so disposed can be coupled to the mounting system between the first and the second lateral portions to suspend the housing from the frame member of the vehicle at a location above at least a portion of an upper surface of the housing;
    whereby at least one of the one or more battery units is disposed beneath a lower edge of the frame member of the vehicle when the battery assembly is coupled with the frame member.

20. The battery assembly of claim 19, wherein the housing comprises a W-shaped housing.

21. The battery assembly of claim 19, wherein the housing is configured to be exposed to a road beneath the vehicle when the battery assembly is coupled to a frame member of the vehicle.

22. The battery assembly of claim 19, wherein at least a portion of one of the one or more battery units is disposed in the first lateral portion and/or in the second lateral portion.

23. The battery assembly of claim 19, wherein at least one of the first lateral portion and the second lateral portion extend upwardly along a vertical portion of the mounting system.

24. The battery assembly of claim 19, wherein the frame member of the vehicle is a lengthwise frame member of the vehicle.

25. The battery assembly of claim 19, wherein the mounting system is configured to couple the housing to the vehicle from beneath the vehicle.

26. The battery assembly of claim 19, wherein the mounting system comprises a pin and groove connection facilitating at least partial support of the housing on the frame member of the vehicle without additional fasteners.

27. The battery assembly of claim 19, wherein the mounting system is configured to support the battery assembly from only outward sides of a frame assembly.

* * * * *

UNITED STATES PATENT AND TRADEMARK OFFICE
CERTIFICATE OF CORRECTION

| | | |
|---|---|---|
| PATENT NO. | : 11,780,337 B2 | |
| APPLICATION NO. | : 17/338315 | |
| DATED | : October 10, 2023 | |
| INVENTOR(S) | : Todd F. Sloan et al. | |

It is certified that error appears in the above-identified patent and that said Letters Patent is hereby corrected as shown below:

In the Specification

Column 2, Line 28, delete "the a" and insert -- a --.

Column 2, Line 33, delete "invention," and insert -- invention; --.

In the Claims

Column 7, Line 38, Claim 6, before "frame" insert -- lengthwise --.

Signed and Sealed this
Nineteenth Day of December, 2023

*Katherine Kelly Vidal*

Katherine Kelly Vidal
*Director of the United States Patent and Trademark Office*